United States Patent Office 3,439,694
Patented Apr. 22, 1969

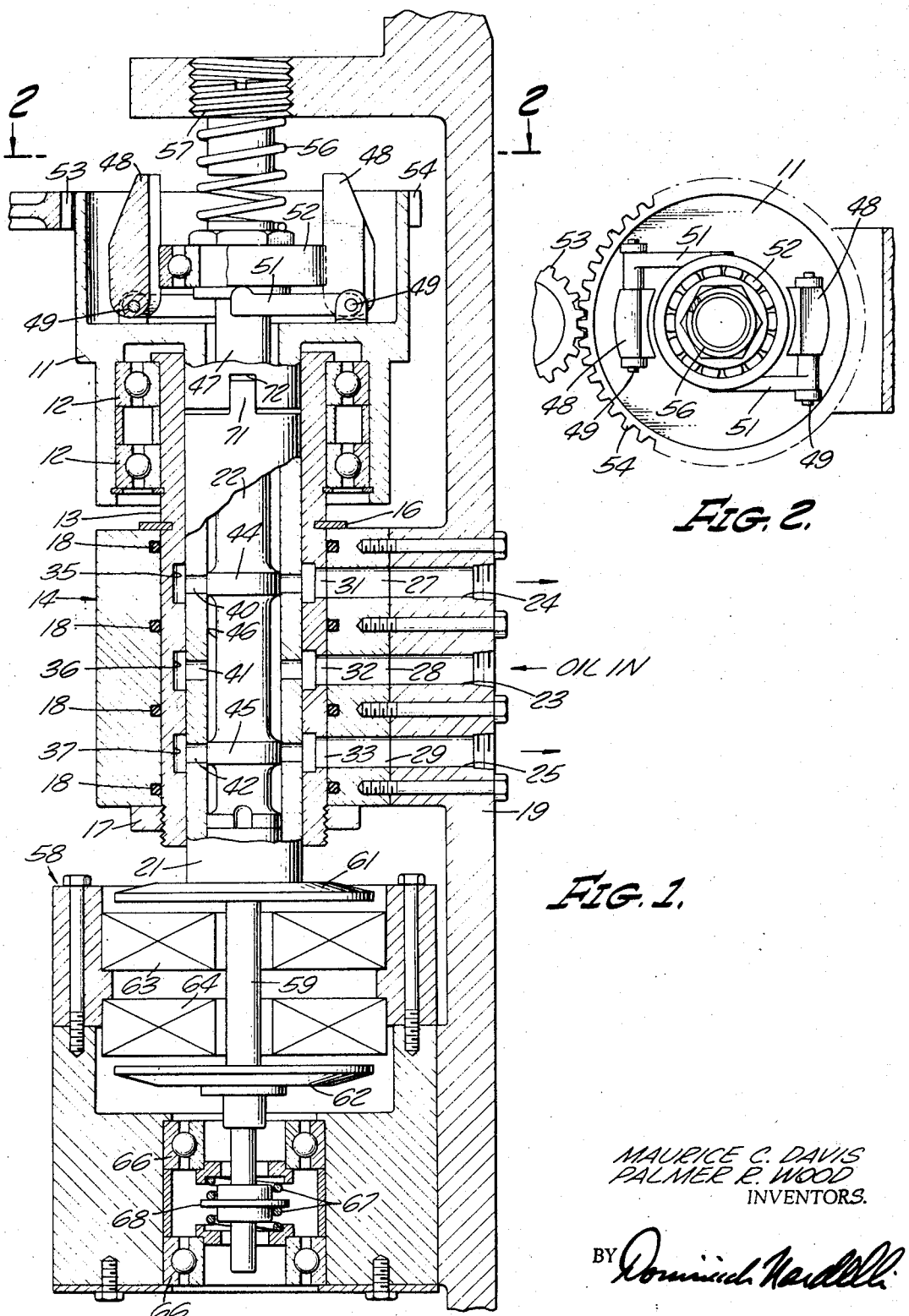

3,439,694
CENTRIFUGAL TYPE SPEED GOVERNOR WITH ELECTROMAGNETIC SET POINT ADJUSTMENT
Maurice C. Davis, Phoenix, and Palmer R. Wood, Scottsdale, Ariz., assignors to The Garrett Corporation, Los Angeles, Calif., a corporation of California
Filed June 23, 1966, Ser. No. 559,858
Int. Cl. G05d 13/10
U.S. Cl. 137—53    12 Claims

ABSTRACT OF THE DISCLOSURE

The subject speed governor comprises a valve having a ported sleeve and a pilot slide moveable axially therein to control fluid flow between an inlet and a pair of outlet ports. The slide is coupled to flyweight levers pivoted for movement in response to centrifugal force in a driven rotatable table member. The slide and sleeve normally occupy a set relative axial position through the valve at a predetermined speed of rotation to prevent fluid flow. Variation in speed of the table causes movement of the flyweights and consequent relative axial movement of the slide and sleeve to establish fluid flow between the inlet and one or the other outlet ports. An electroresponsive means, including stationary field coils and magnetically responsive disks attached to the ported sleeve, are provided to adjust the sleeve and thereby change the set position. Resilient means yieldably oppose movement of the flyweights and slide in response to centrifugal force. Additional resilient means tends to maintain the ported sleeve in a predetermined set position. The sleeve is splined to the flyweight supporting table so as to be rotated thereby relative to the slide to reduce mechanical hysteresis.

---

This invention relates to a governor and, more particularly, to a centrifugal-type governor.

In general, centrifugal-type governors employ the principle that rotating weights produce a centrifugal force which is proportional to the rotating speed. Thus, any change in speed produces a change in the centrifugal force. This force is used to actuate a valve so that the flow of fluid therethrough changes, causing the prime mover either to speed up or slow down to the set speed or set point of the governor. Up to now, for a given governor the set point has been changed by changing the weights of the governor or by changing the force exerted by a speeder spring that is used to sense the centrifugal force produced by the rotating weights. Obviously, every change in the set point for the governor would change the hunting characteristics of the governor because the resultant centrifugal force of the governor would change when the weights or spring force has been changed.

A general object of this invention is to produce an improved governor wherein the set point is changed without affecting the centrifugal characteristics therein.

A more specific object of this invention is to produce a centrifugal-type governor having a pilot slide slidably disposed within a sleeve wherein both are movable with respect to a fixed reference so that the set speed of the governor may be changed independently of the flyweight force and the speeder spring force.

Another object of this invention is to provide continuous rotating motion between the sleeve and the pilot slide in the before-mentioned object so that hysteresis therein is reduced.

Briefly, the present preferred embodiment of the invention includes two or more flyweights pivotally mounted on a rotating table which rotates about an axis and within a fixed plane, and includes a valve movable along the axis of rotation of the table. The valve includes a sleeve having preferably two fluid discharge ports and a pilot slide disposed moveable therein. The position of the ports in the sleeve and the shape of the pilot slide are such that when the slide is disposed at one end of the sleeve, fluid is discharged through the first port and is shut off from the second port, and when the pilot slide is disposed at the other end of the port sleeve, fluid is discharged through the second port and is shut off from the first port. The flyweights, being pivotally mounted on the rotating table, are restrained from pivoting outwardly of the axis of rotation by a speeder spring. The flyweights are coupled to the pilot slide so that when the flyweights tend to pivot outwardly against the force of the spring due to an increase in the centrifugal force, the slide moves with respect to the sleeve to cause fluid to discharge through the first port, and when the flyweights tend to pivot inwardly due to a decrease in the centrifugal force, the slide moves in the other direction with respect to the sleeve to cause fluid to discharge through the second port. When the table is rotating at the set speed, no fluid is discharged from either port. Electromagnetic means are provided to move the sleeve parallel to the axis of rotation so that the set point of the governor is changed, causing the rotational speed of the table to hunt about a new set point. In addition, means are provided to rotate the sleeve with respect to the slide to produce a governor with little or no hysteresis.

These and other objects, features and advantages will become more apparent from the following description of the invention and the accompanying drawings, in which:

FIG. 1 is a vertical section through a governor embodying the present invention; and FIG. 2 is a section along line 2—2 as viewed in the direction of the arrows.

The advantages of the present invention can be utilized in many branches of the field of governor control. The specific embodiment shown in the drawing is utilized to direct hydraulic control fluid under pressure to a hydraulic piston and cylinder device for controlling the output of a hydraulic pump, the output of which is utilized to drive a hydraulic motor whose speed is to be governed. A typical system, utilizing a hydraulic piston and cylinder device for controlling a hydraulic pump, is shown in United States Patent No. 2,803,112.

Referring to FIG. 1, there is shown a centrifugal-type governor incorporating the present invention. The governor includes a flyweight table 11 mounted by suitable bearings 12 having the outer races thereof disposed within a cylindrical apron concentric with the axis of rotation of and depending from the table 11, the inner races of the bearing 12 being secured on a cylindrical member 13. The member 13 is mounted to manifold 14 in fixed relationship thereto by a spring retainer 16 and a nut 17. Suitable rubber O-rings 18 are spaced between the member 13 and manifold 14 to provide suitable fluid seals for reasons that will become apparent hereinafter. The manifold 14 is mounted to a frame 19, while the cylindrical member 13 supports a valve having a ported sleeve 21 and a pilot slide 22.

The frame 19 is provided with a port 23 connected to a source of fluid under pressure and with a pair of outlet ports 24 and 25. Ports 23, 24 and 25 are aligned with bores 27, 28 and 29, respectively, in manifold 14, and in turn, bores 27, 28 and 29 communicate, respectively, with radially disposed bores 31, 32 and 33, formed in cylindrical member 13. In addition, member 13 has three annular grooves 35, 36 and 37 formed on the inside surface thereof, which grooves communicate with bores 31, 32 and 33, respectively. The sleeve 21 is provided with ports 40, 41 and 42 which communicate, respectively, with the grooves 35, 36 and 37.

The pilot slide 22 is provided with spaced lands 44 and 45 separated by an intervening reduced portion 46 so that when the valve is in the neutral position, as shown, the ports 40 and 42 are covered by the lands 44 and 45, respectively. An upward movement of the pilot slide 22 with respect to the sleeve 21 would discharge fluid under pressure through ports 40, and a downward movement of the pilot slide 22 would discharge fluid under pressure through ports 42. To effect movement of the pilot slide 22, a stem portion 47 on the slide 22 is suitably coupled to flyweights 48 mounted on table 11. The flyweights 48 are pivotally mounted on the table 11 by pins 49 that are disposed normal to the axis of rotation of the table. The flyweights 48 have arms 51 disposed at right angles thereto and integral therewith. The arms 51 engage the outer race of a ball bearing 52 whose inner race is suitably mounted on the stem portion 47 of the slide 22. Thus, whenever the table 11 is rotated, for example, by a pinion gear 53 engaging gear teeth 54 on the table 11, the flyweights 48 tend to swing outwardly about pins 49, causing the arms 51 to raise the bearing 52 and, in turn, the slide 22. A compression spring 56 is used to restrain the upward movement of slide 22 so that the distance of travel of the slide 22 is proportional to the centrifugal force.

The operation of the governor, as described so far, is that changes in rotational speed of the table 11 would cause a corresponding pivoting action of the flyweights 48, outwardly if the speed increases, and inwardly if the speed decreases. Such pivotal movement of the flyweights is transmitted into a valving movement, resulting in directing control fluid under pressure to one end of a pressure responsive device which, in turn, tends to compensate for the changes in speed sensed by the governor. Thus, the speed of the governor is maintained at the set point. If the governor is required to control speed at a higher or lower level, the set point of the governor has to be adjusted. The present invention provides a novel electromechanical means 58 to change the set point of the governor while the governor is operating independently of the spring force and mass of the flyweights. The set point of the governor is changed by means 58 by moving the sleeve 21 closer to or away from the table 11. Since this motion of the slide 21 does not interfere with the centrifugal action of the flyweight, immediate response in set point changes is obtained with a reduction in mechanical hysteresis.

The means 58 includes a stem 59 fixed to the end of the sleeve 21 opposite the rotating table 11. The stem 59 has fixed thereto two spaced discs 61 and 62 made of magnetic material, preferably with a high permeability. Between the two discs 61 and 62 are disposed two electromagnetic coils 63 and 64 suitably fixed to frame 19 and having central openings through which the stem 59 passes. The other end of the stem 59 is mounted on thrust bearings 66 through two compression springs 67 acting, respectively, between the bearings 66 and a collar 68 fixed to the shaft. The bearings 66 are suitably mounted to frame 19. The function of the bearings will be explained hereinafter. However, the function of the two compression springs 67 acting against the collar 68 is that when, for example, current is supplied to coil 63, disc 61 will be attracted to the coil and the springs 67 will cause the distance traversed by the disc 61 to be proportional to the current. Then, when current is supplied to the other coil 64, the springs 67 will cause the distance traversed by the disc 62 to also be proportional to the current. Current is supplied to the coils 63 and 64 as required through suitable leads (not shown). Thus, to lower the set point of the governor, coil 63 is energized to pull the disc 61 and sleeve 21 downward. Then, in order for the governor to be in the neutral position with no fluid flowing out of either port 40 or 42, the table has to slow up so that the weights can swing inwardly to allow the pilot slide 22 to move down and cover the ports. Conversely, the set point is raised by energizing coil 64.

To further reduce the mechanical hysteresis in the system, the bearings 66 permit the sleeve 21 to be rotated by the rotating table 11. The sleeve 21 is provided with one or more fingers 71 engaging respective notches 72 in an inner cylindrical apron concentric with the axis of rotation of and depending from the rotating table 11. The fingers 71 and notches 72 permit relative axial motion between the table 11 and the sleeve without interfering with the rotational motion. Thus, the discs 61 and 62 and springs 67 rotate with the sleeve, and the size and shape of the springs 67 are such that disc 61 is prevented from touching coil 63 if coil 63 is overenergized, and disc 62 is prevented from touching coil 64 if coil 64 is overenergized. The sleeve 21 is made to fit snuggly within member 13 so that a journal bearing is produced therebetween.

The electromagnetic means for trimming the set point of the governor disclosed herein provides a system which effectively and rapidly changes the relative position of the valve with respect to the rotating weights. The system is simply and substantially trouble-free. Since there is provided both a relative twisting motion between the sleeve and pilot slide and a means for trimming the set point action, the governor is free from mechanical hysteresis over a wide operating range. The governor is reversible and can operate without discontinuity.

With the present disclosure in view, modification of the invention will appear to those skilled in the art. Accordingly, the invention is not limited to the exact details of the illustrated preferred embodiment but includes all such modifications and variations coming within the scope of the invention as defined in the claims.

We claim:
1. A governor comprising:
   a flyweight carrier disposed to rotate about an axis of rotation,
   a flyweight movably mounted on said carrier so that the displacement of said flyweight relative to the axis of rotation is related to the rotational speed of said carrier,
   means for rotating said carrier,
   a valve having first and second means movable relative to each other for controlling the rate of fluid flow through said valve,
   third means for coupling the first means of said valve to said flyweight so that said first means moves relative to said carrier as said flyweight is displaced due to centrifugal force, and
   electroresponsive means coupled to said second means for moving said second means relative to said carrier to change the set point of said governor.
2. The governor of claim 1 wherein said electroresponsive means comprises:
   an electromagnetic coil and a magnetic permeable material fixed to said second means so that when said coil is energized said permeable material moves toward said coil causing said second means to move relative to said carrier.
3. The governor of claim 1 wherein:
   said second means comprises a sleeve having a radial port through which said fluid passes,
   said first means comprises a pilot slide disposed in sliding relation within said sleeve to control the effective opening of said port, and
   fifth means are provided to rotate said sleeve about said axis of rotation to substantially reduce mechanical hysteresis in the governor.
4. The governor of claim 3 wherein said fourth means comprises:
   an electromagnetic coil and a magnetic permeable material fixed to said sleeve so that when said coil is energized said permeable material moves toward said coil causing said sleeve to move relative to said carrier.

5. The governor of claim 1 wherein:
a pin-mount is provided on said carrier to cause said flyweight to pivot about a pivot axis normal to the axis of rotation,
an arm is disposed at right angles to said flyweight extending from said pivot axis so that the arm pivots with said flyweight about said pivot axis,
said third means engages said arm so that said first means moves as said flyweight pivots about said pivot axis.

6. The governor of claim 3 wherein:
a pin-mount is provided on said carrier to cause said flyweight to pivot about a pivot axis normal to the axis of rotation,
an arm is disposed at right angles to said flyweight extending from said pivot axis so that the arm pivots with said flyweight about said pivot axis,
said third means includes a ball bearing having the inner race fixed to said pilot slide and a compression spring urging said pilot slide against the displacement thereof due to centrifugal force,
said arm engages the outer race of said bearing causing the spring to compress in response to movement of said flyweights under centrifugal force as said carrier rotates.

7. The governor of claim 6 wherein said electroresponsive means comprises:
an electromagnetic coil and a magnetic permeable material fixed to said sleeve so that when said coil is energized said permeable material moves toward said coil causing said sleeve to move relative to said carrier.

8. The governor of claim 7 wherein:
a spring is provided to urge said sleeve counter to the force exerted by the coil on said permeable material.

9. The governor of claim 3 wherein said flyweight carrier comprises:
a table disposed normal to said axis of rotation,
an outer and an inner cylindrical apron fixed to one side of said table and concentric with said axis of rotation,
a cylindrical member disposed between said outer and said inner aprons,
a bearing disposed between said outer apron and said cylindrical member,
said sleeve being disposed in journal relation with said cylindrical member, said fifth means comprises a finger cooperating with a recess formed on said sleeve and said inner apron so that said sleeve rotates with said table,
said flyweight is movably mounted on said table opposite said aprons, and
said slide extending through an axial opening formed in said table to engage said flyweight.

10. The governor of claim 9 wherein:
an electromagnetic coil and a magnetic permeable material fixed to said sleeve so that when said coil is energized said permeable material moves toward said coil causing said sleeve to move relative to said table.

11. The governor of claim 10 wherein:
a pin-mount is provided on said table to cause said flyweight to about a pivot axis normal to the axis of rotation,
an arm is disposed at right angles to said flyweight extending from said pivot axis so that the arm pivots with said flyweight about said pivot axis,
said third means includes a ball bearing having the inner race fixed to said pilot slide and a compression spring to urge said pilot slide against the displacement thereof due to centrifugal force, and
said arm engages the outer race of said bearing causing the spring to compress in response to movement of said flyweight under centrifugal force as said table rotates.

12. The governor of claim 10 wherein a spring is provided to urge said sleeve counter to the force exerted by the coil on said permeable material.

References Cited

UNITED STATES PATENTS

| | | | |
|---|---|---|---|
| 2,101,486 | 12/1937 | Zelov | 137—19 X |
| 2,314,841 | 3/1943 | Crafts | 137—34 |
| 2,441,811 | 5/1948 | Gottlieb | 137—34 |
| 2,839,070 | 6/1958 | Berninger | 137—19 |
| 2,890,877 | 6/1959 | Straznickas | 73—540 X |
| 3,215,155 | 11/1965 | Oishi | 137—19 X |

CLARENCE R. GORDON, *Primary Examiner.*

U.S. Cl. X.R.

73—540; 137—19, 33